(12) United States Patent
Jang et al.

(10) Patent No.: US 12,155,050 B2
(45) Date of Patent: Nov. 26, 2024

(54) BATTERY MODULE AND BATTERY PACK INCLUDING THE SAME

(71) Applicant: LG Energy Solution, LTD., Seoul (KR)

(72) Inventors: Sunghwan Jang, Daejeon (KR); Junyeob Seong, Daejeon (KR); Myungki Park, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 397 days.

(21) Appl. No.: 17/668,224

(22) Filed: Feb. 9, 2022

(65) Prior Publication Data

US 2022/0271364 A1  Aug. 25, 2022

(30) Foreign Application Priority Data

Feb. 16, 2021  (KR) .................. 10-2021-0020449

(51) Int. Cl.

| | |
|---|---|
| *H01M 10/653* | (2014.01) |
| *H01M 10/613* | (2014.01) |
| *H01M 10/647* | (2014.01) |
| *H01M 10/658* | (2014.01) |
| *H01M 50/211* | (2021.01) |
| *H01M 50/507* | (2021.01) |

(52) U.S. Cl.
CPC ....... *H01M 10/653* (2015.04); *H01M 10/613* (2015.04); *H01M 10/647* (2015.04); *H01M 10/658* (2015.04); *H01M 50/211* (2021.01); *H01M 50/507* (2021.01)

(58) Field of Classification Search
None
See application file for complete search history.

(56) References Cited

U.S. PATENT DOCUMENTS

| | | | |
|---|---|---|---|
| 2019/0051954 A1 | 2/2019 | Kim et al. | |
| 2019/0067656 A1* | 2/2019 | Zhang | H01M 50/289 |
| 2019/0100112 A1 | 4/2019 | Jaensch et al. | |
| 2020/0006825 A1 | 1/2020 | Lee et al. | |
| 2020/0243817 A1 | 7/2020 | Kwak et al. | |
| 2020/0343607 A1 | 10/2020 | Kim et al. | |

(Continued)

FOREIGN PATENT DOCUMENTS

| | | |
|---|---|---|
| JP | 2005-071674 A | 3/2005 |
| KR | 10-2019-0038362 A | 4/2019 |

(Continued)

*Primary Examiner* — Basia A Ridley
*Assistant Examiner* — Heng M. Chan
(74) *Attorney, Agent, or Firm* — Bryan Cave Leighton Paisner LLP (57) ABSTRACT

A battery module including a battery cell stack including a plurality of battery cells stacked in a first direction; a housing for the battery cell stack; a first thermal conductive resin layer located between the battery cell stack and a bottom part of the housing; and a second thermal conductive resin layer located between the battery cell stack and an upper part of the housing. At least one liquid injection hole for injecting a thermal conductive resin is formed in the upper part of the housing, and at least one shielding pad is located on the lower surface of the upper part of the housing. The shielding pad has a central opening and the shielding pad surrounds the liquid injection hole.

11 Claims, 8 Drawing Sheets

(56) References Cited

U.S. PATENT DOCUMENTS

2021/0184289 A1    6/2021  Jeong et al.
2021/0203041 A1    7/2021  Lee et al.
2021/0226291 A1*   7/2021  Kim .................... H01M 50/503

FOREIGN PATENT DOCUMENTS

KR    10-2019-0054805  A    5/2019
KR    10-2020-0001692  A    1/2020
KR    10-2020-0080067  A    7/2020
KR    10-2020-0080069  A    7/2020
KR         10-2207881  B1   1/2021
WO    WO-2020116879   A1 *  6/2020  ............ H01M 50/20

* cited by examiner

[FIG. 1]

Prior Art

[FIG. 2]

Prior Art

[FIG. 3]

Prior Art

BATTERY MODULE AND BATTERY PACK INCLUDING THE SAME

CROSS-REFERENCE TO RELATED APPLICATIONS

This application claims priority under 35 U.S.C. § 119(a) to Korean Patent Application No. 10-2021-0020449 filed on Feb. 16, 2021, the entire disclosure of which is incorporated in its entirety as if fully set forth herein.

FIELD

The present disclosure relates to a battery module and a battery pack including the same, and more particularly, to a battery module with improved cooling performance and battery pack including same.

BACKGROUND

Along with advances in technological development and increasing demand for a mobile device, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a housing that houses the battery cell stack in an internal space.

Figure 1:
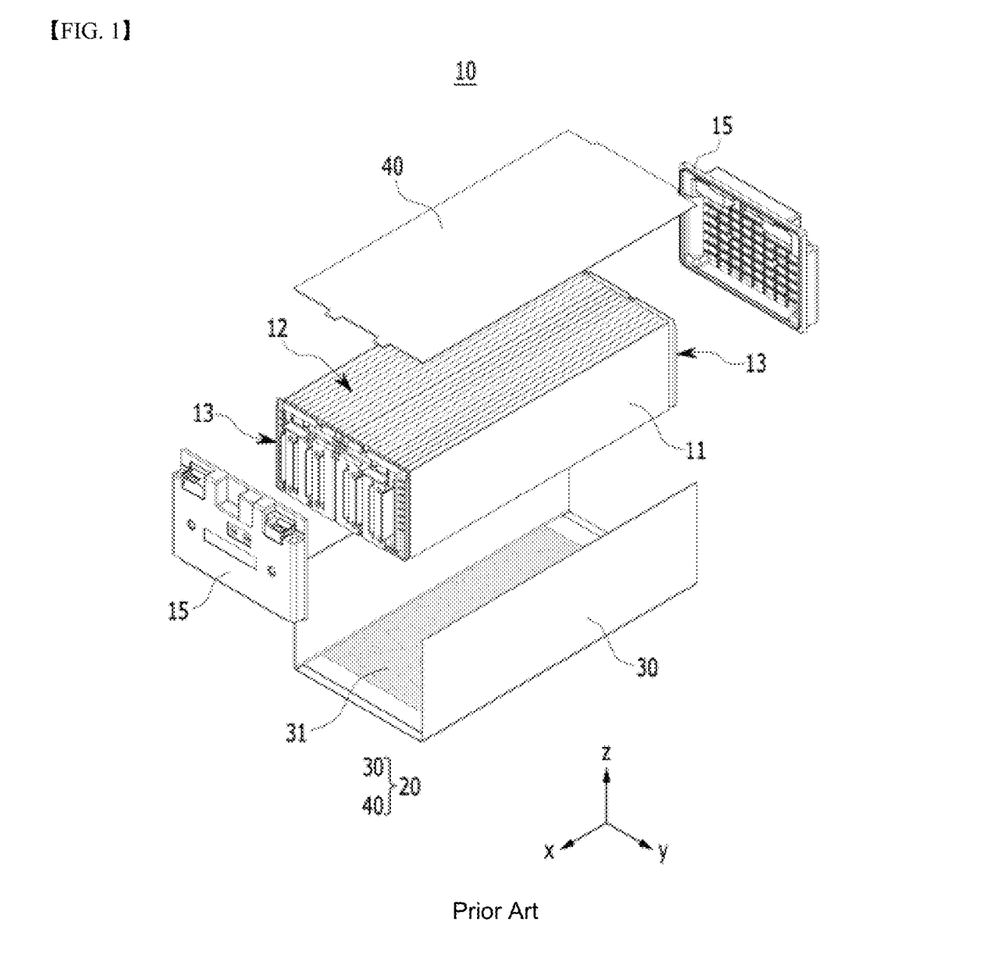
FIG. 1 is an exploded perspective view of a conventional battery module.
Figure 2:
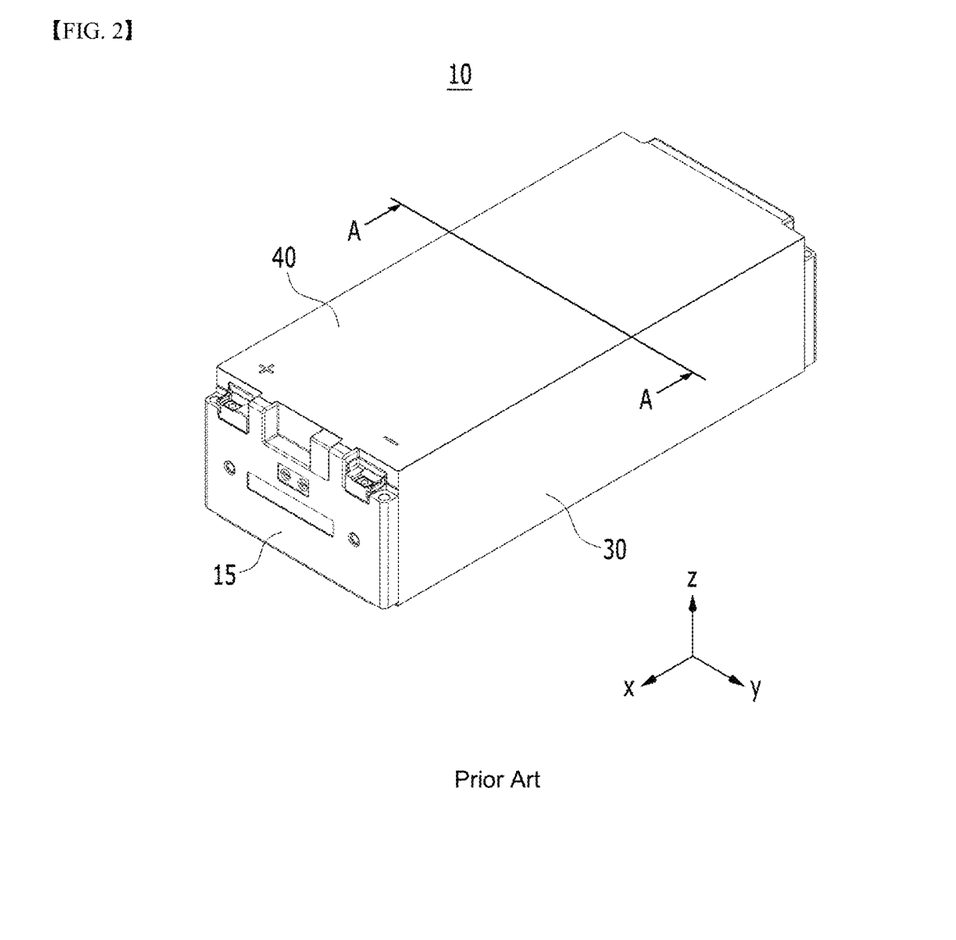
FIG. 2 is a perspective view of the battery module of FIG. 1, in which the components of the battery module are combined.

FIG. 1 is an exploded perspective view of a conventional battery module. FIG. 2 is a perspective view of the battery module of FIG. 1 after its components have been combined.

As illustrated in FIGS. 1 and 2, a conventional battery module 10 includes a battery cell stack 12 in which a plurality of battery cells 11 are stacked in one direction, a housing 20 for the battery cell stack 12, front and rear end plates 15 covering the front and rear surfaces, respectively, of the battery cell stack, and bus bar frames 13 positioned between the front and rear end plates 15 and the battery cell stack 12. The housing 20 includes a lower frame 30 for covering the lower part and both side surfaces of the battery cell stack 12 and an upper plate 40 for covering the upper surface of the battery cell stack 12. The battery module 10 is configured such that a thermal conductive resin layer 31 can be applied to the bottom surface of the lower frame 30, which covers the lower surface of the battery cell stack 12 to cool heat generated in the battery cell stack 12.

Figure 3:
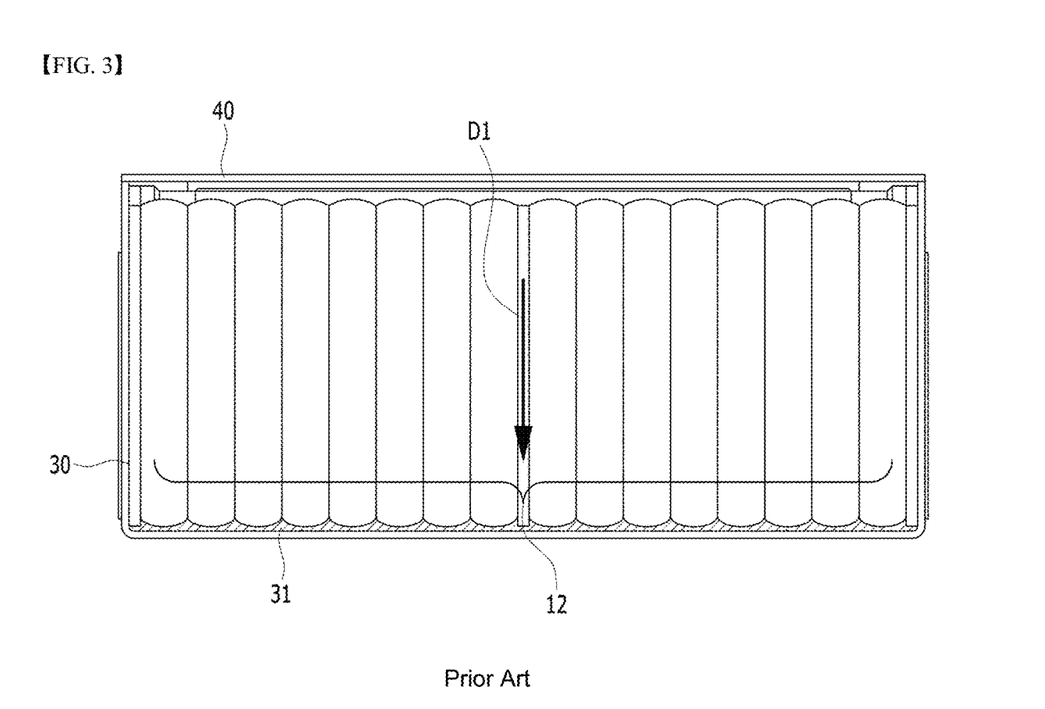
FIG. 3 is a cross-sectional view along the line A-A of FIG. 2.

FIG. 3 is a cross-sectional view along the line A-A of FIG. 2.

As illustrated in FIGS. 1 and 3, the conventional battery module 10 has a structure that cools the lower part of the battery cell stack 12, which is a structure in which heat generated in the plurality of battery cells 11 flows in a first cooling direction D1 toward the lower part of the battery cell stack 12. However, since the thermal conductive resin layer 31 is formed only at a position corresponding to the lower surface of the battery cell stack 12, the temperature of the portion of each of the plurality of battery cells 11 that is close to the thermal conductive resin layer 31 is low, and the temperature of the portion of each of the plurality of battery cells 11 that is farther away from the thermal conductive resin layer is high. Thus, a temperature difference occurs inside each of the plurality of battery cells 11. In particular, the temperature increases in the direction toward the upper part of each of the plurality of batter cells, and the temperature decreases toward the lower and central parts of each of the plurality of battery cells 11.

In particular, as the positive electrode and the negative electrode are located at both end parts of each of the plurality of battery cells 11, heat is generated relatively more than the central part in the charging/discharging process of the battery module 10. However, the thermal conductive resin layer 31 located under the plurality of battery cells 11 does not dissipate heat generated at both end parts of the plurality of battery cells 11 at a sufficiently rapid rate, because the thermal conductive resin layer 31 only dissipates the heat transferred from the lower part of the battery cells 11. In particular, considering that the temperature of the plurality of battery cells 11 is one of the factors that limits the output of the battery, the local temperature rise that occurs in the plurality of battery cells 11 is highly likely to limit the output of the battery early, and thus improvement thereof is needed.

SUMMARY

It is an objective of the present disclosure to provide a battery module with improved cooling performance of battery cells, and a battery pack including the same.

The objectives of the present disclosure are not limited to the aforementioned objectives, and other objectives which are not described herein should be clearly understood by those skilled in the art from the following detailed description and the accompanying drawings.

According to an exemplary embodiment of the present disclosure, there is provided a battery module comprising: a battery cell stack in which a plurality of battery cells are stacked in a first direction; a housing for the battery cell stack; a first thermal conductive resin layer located between the battery cell stack and a lower part of the housing; and a second thermal conductive resin layer located between the battery cell stack and an upper part of the housing, wherein at least one liquid injection hole for injecting a thermal conductive resin is formed in the upper part of the housing, wherein at least one shielding pad is located on the lower surface of the upper part of the housing, and wherein the shielding pad has a central opening which surrounds the liquid injection hole.

The second thermal conductive resin layer may be formed of the thermal conductive resin injected into the at least one liquid injection hole.

The second thermal conductive resin layer may be surrounded by the shielding pad.

The liquid injection hole and the shielding pad may be located adjacent to the ends of one side of the upper part of the housing and not the central part of the upper part of the housing.

The liquid injection hole and the shielding pad may be located at the corner of one side of the upper part of the housing.

The battery module may further include bus bar frames located on the front and rear surfaces of the battery cell stack, and an end plate covering each of the bus bar frames, wherein a first bus bar is attached to the central part of the bus bar frame, and a second bus bar is attached to both side parts of the bus bar frame, respectively.

The second bus bar may be a terminal bus bar.

The liquid injection hole and the shielding pad may be located respectively adjacent to the second bus bar.

The housing comprises a U-shaped lower frame including a bottom part and two side parts connected to opposite sides of the bottom parts, and an upper plate of the housing attached to the U-shaped frame, which covers the battery cell stack.

The first thermal conductive resin layer is formed by applying a thermal conductive resin to the bottom part of the U-shaped frame or attaching a heat transfer pad.

According to an exemplary embodiment of the present disclosure, there is provided a battery pack comprising the above-mentioned battery module.

According to the exemplary embodiments of the present disclosure, a thermal conductive resin layer is formed in the upper part of the battery cell stack, thereby capable of suppressing a local temperature rise in the battery cell and reducing the temperature difference.

The effects of the present disclosure are not limited to the effects mentioned above and additional other effects not described above will be clearly understood from the description of the appended claims by those skilled in the art.

DETAILED DESCRIPTION

Hereinafter, various exemplary embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience, and the present disclosure is not necessarily limited to those illustrated in the drawings. In the drawings, the thickness of layers, regions, etc. are exaggerated for clarity. In the drawings, the thicknesses of some layers and regions are shown to be exaggerated for convenience.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means a target portion is viewed from the upper side, and when referred to as "cross-sectional", it means a target portion is viewed from the side of a cross section cut vertically.

Herein below, the battery module according to an exemplary embodiment of the present disclosure will be described. The description herein is with reference to the front surface without being necessarily limited thereto, and the rear surface may be described in a similar manner and having similar components.

Figure 4:
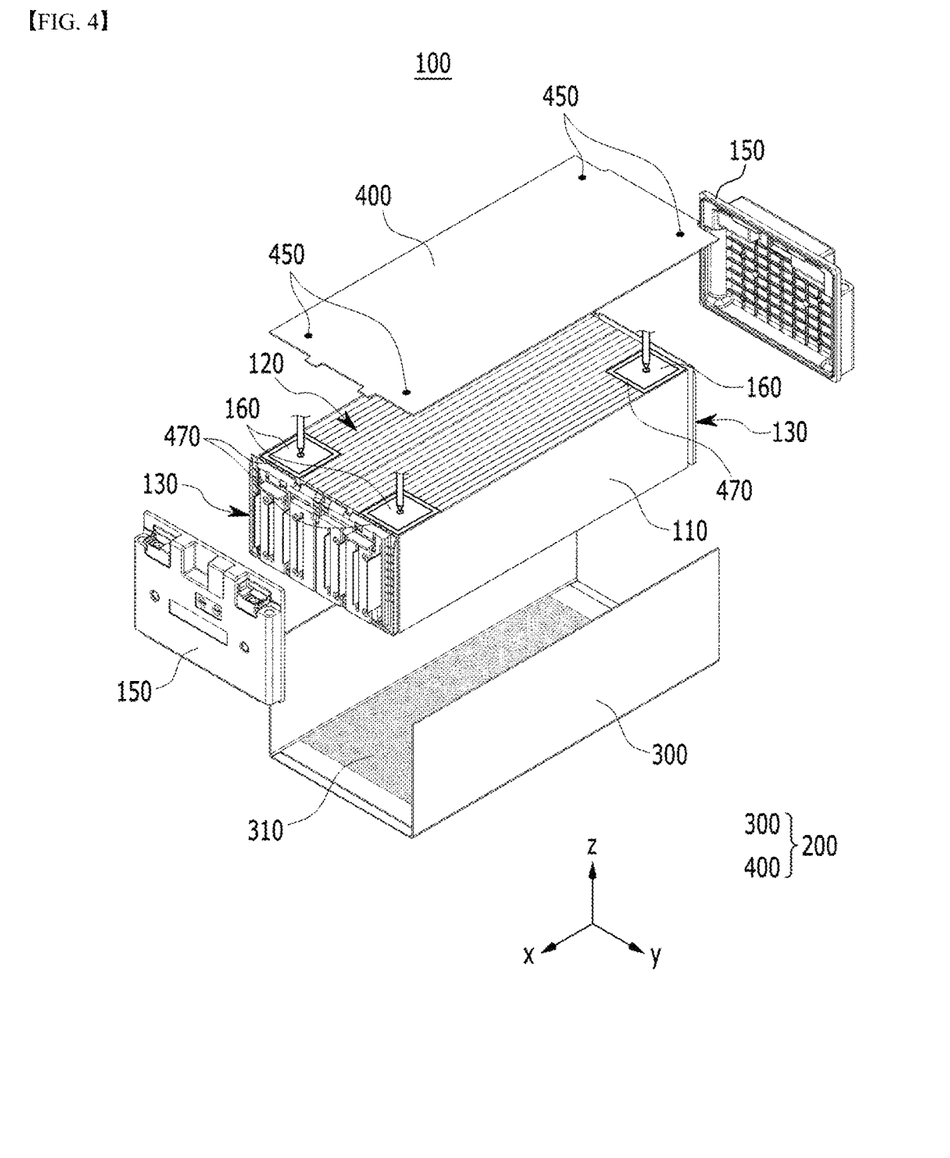
FIG. 4 is an exploded perspective view of a battery module according to an exemplary embodiment of the present disclosure.
Figure 5:
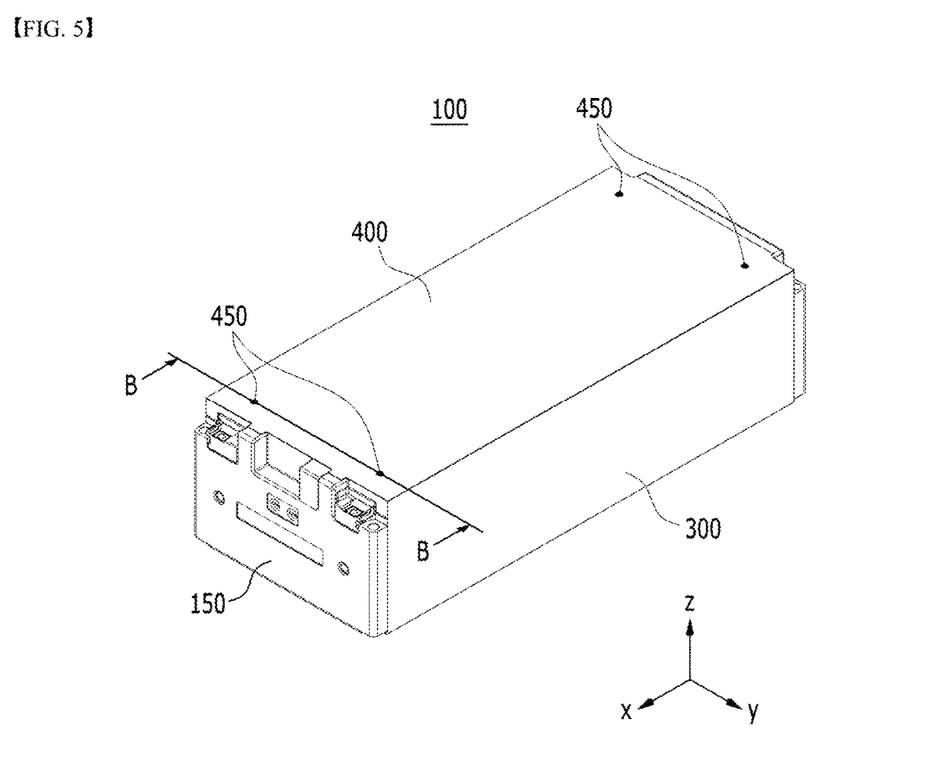
FIG. 5 is a perspective view of the battery module of FIG. 4, in which the components of the batter module are combined.

FIG. 4 is an exploded perspective view of a battery module according to an exemplary embodiment of the present disclosure. FIG. 5 is a perspective view of the battery module of FIG. 4 after all the components are combined.

The battery module 100 according to an exemplary embodiment of the present disclosure includes a battery cell stack 120 in which a plurality of battery cells are stacked in a first direction (y-axis); a housing 200 that houses the battery cell stack 120; and a first thermal conductive resin layer 310 located between the battery cell stack 120 and the lower part of the housing 200.

Further, the battery module 100 further includes bus bar frames 130 located at each of the front and rear surfaces of the battery cell stack 120, and end plates 150 for covering the bus bar frames 130. Here, the bus bars 141 and 145 (FIG. 7) that are electrically connected to the battery cell stack 120 can be disposed in the bus bar frame 130.

As illustrated in FIG. 4, a plurality of battery cells 110 are stacked in a first direction (y-axis direction) in the battery cell stack 120 housed in the housing 200, wherein the battery cells 110 are preferably pouch-type battery cells. The battery cells 110 may be manufactured by housing the electrode assembly in a pouch of a laminate sheet including a resin layer and a metal layer, and then heat-sealing a part of the pouch. A plurality of such battery cells 110 can form a battery cell stack 120, where the battery cells are stacked to be electrically connected to each other.

The housing 200 includes a U-shaped frame 300 including a bottom part and two side parts connected to either side of the bottom surface to form a U-shape, and an upper plate 400 attached to the U-shaped frame 300 for covering the upper part of the battery cell stack 120. That is, the lower part of the housing 200 may be a U-shaped frame 300, and an upper part of the housing 200 may be an upper plate 400. However, the housing 200 can be replaced with an L-shaped frame or a U-shaped frame and another shaped frame such as an upper plate, without being limited thereto.

Further, the first thermal conductive resin layer 310 may be formed on the inner surface of the bottom part of the housing 200. In other words, the first thermal conductive resin layer 310 can be formed by applying a thermal conductive resin onto the inner bottom surface of the U-shaped frame 300.

In one example, the first thermal conductive resin layer 310 may be formed by attaching a heat transfer pad. In another example, the first thermal conductive resin layer 310 may be formed by applying a thermal conductive resin to the inner bottom surface of the U-shaped frame 300 before the battery cell stack 120 is attached to the bottom part of the U-shaped frame 300. Then, the first thermal conductive resin layer 310 can be formed by curing.

Thereby, the first thermal conductive resin layer 310 can transfer heat generated in the plurality of battery cells 110 to the bottom of the battery module 100 and can fix the battery cell stack 120 by an adhesive force of the first thermal conductive resin layer 310.

Next, a liquid injection hole 450 and a shielding pad 470 included in the second thermal conductive resin layer 160 and the upper plate 400 will be described in detail.

Figure 6:
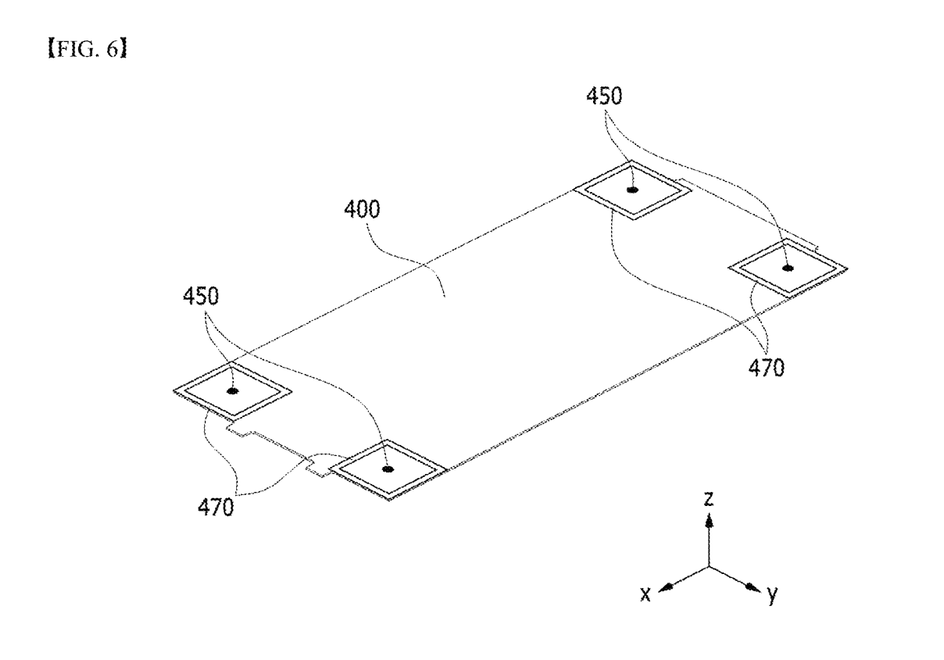
FIG. 6 is a perspective, upside down view of the upper part of the housing of the battery module of FIG. 4.
Figure 7:
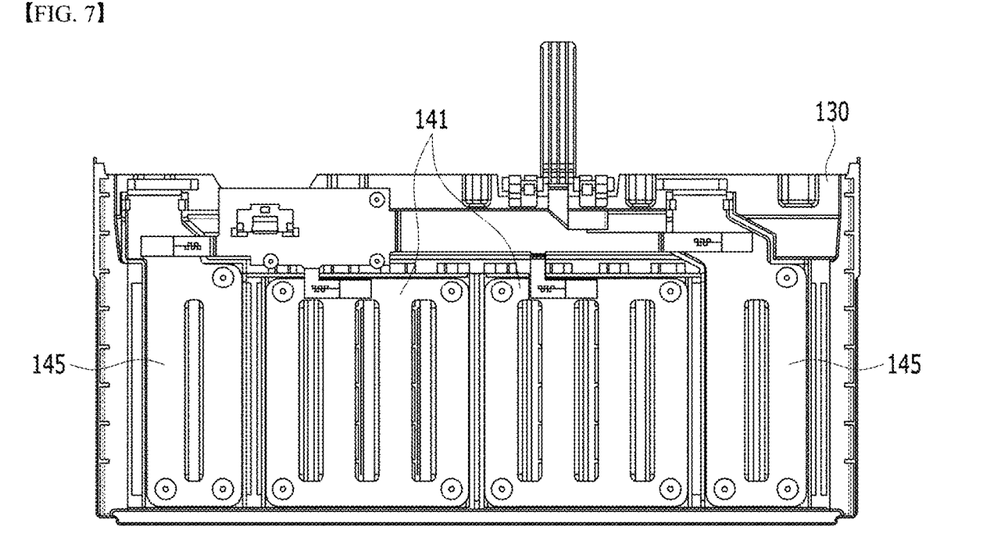
FIG. 7 is an illustration of a bus bar frame of the battery module of FIG. 4.
Figure 8:
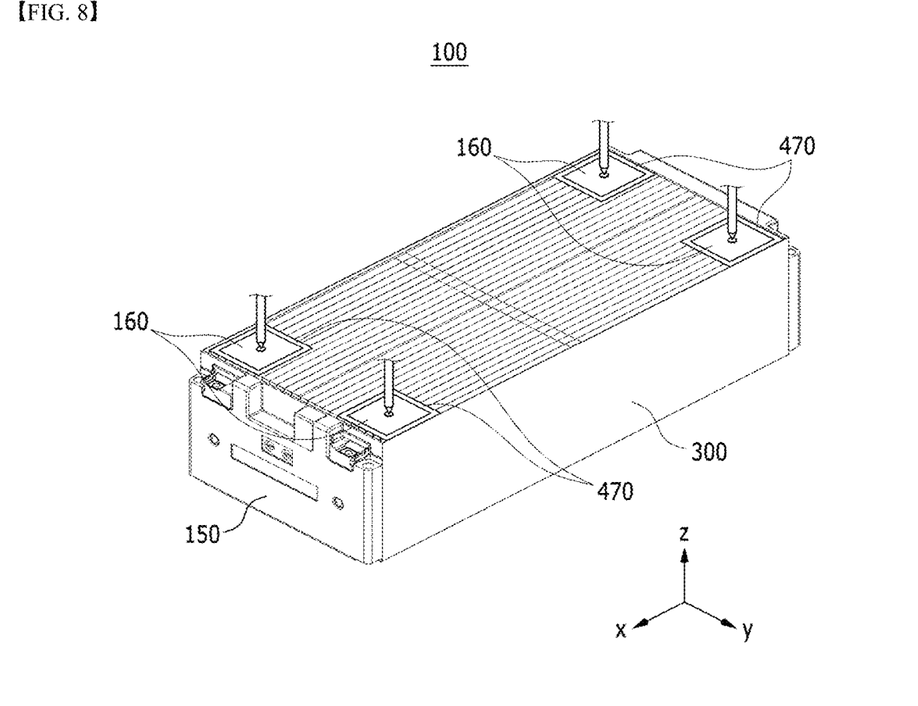
FIG. 8 is a perspective view of the battery module of FIG. 4 after the top part of the housing is removed.

FIG. 6 is a perspective view of the battery module of FIG. 4 illustrating an upside down upper part of the housing 200. FIG. 7 is a view of a bus bar frame of the battery module of FIG. 4. FIG. 8 is a perspective view of the housing 200 after the upper part of the housing is removed.

As illustrated in FIG. 6, in the battery module 100 according to the present embodiment, at least one liquid injection hole 450 for injecting the thermal conductive resin may be formed in the upper part of the housing 200. In other words, at least one liquid injection hole 450 may be formed in the upper plate 400.

Here, the liquid injection hole 450 passes through the upper plate 400, and may be a hole having a predetermined size. More specifically, the size of the liquid injection hole 450 such that the thermal conductive resin is easily injected through the hole and the outside air flows in in a relatively small amount.

A thermal conductive resin may be injected into the liquid injection hole 450. The thermal conductive resin injected into the liquid injection hole 450 may be in the form of a resin or a paste, without being limited thereto. Then, the thermal conductive resin layer 160 is formed by curing the resin. That is, the thermal conductive resin injected into the at least one liquid injection hole 450 may form the second thermal conductive resin layer 160. Here, the second thermal conductive resin layer 160 can be located between the battery cell stack 120 and the upper part of the housing 200. In other words, the second thermal conductive resin layer 160 may be located between the battery cell stack 120 and the upper plate 400.

Thereby, the battery module 100 according to the present embodiment can cool the upper surface of the battery cell stack 120 through the second thermal conductive resin layer 160, and thus can further improve the cooling performance together with the first thermally conductive resin layer 310.

As illustrated in FIG. 6, in the battery module 100 according to the present embodiment, at least one shielding pad 470 is located on the lower surface of the upper part of the housing 200. In other words, at least one shielding pad 470 is located on the lower surface of the upper plate 400. The shielding pad 470 has a central opening, and surrounds the liquid injection hole 450. Further, the shielding pad 470 can protrude in a direction corresponding to a direction (z-axis) toward the battery cell stack 120. Preferably, the shielding pad 470 protrudes in a direction corresponding to a direction (z-axis) toward the battery cell stack, and can come into contact with the upper surface of the battery cell stack.

The shielding pad 470 may include a material having high insulation. In one example, it may include at least one of polyethylene terephthalate (PET), polycarbonate (PC), polyimide (PI), and polyamide (PA). However, any material can be used without limitation as long as it can prevent the thermal conductive resin from overflowing even without reacting with the thermal conductive resin injected into the injection hole 450.

As illustrated in FIGS. 6 and 8, the second thermal conductive resin layer 160 may be surrounded by a shielding pad 470. In other words, the second thermal conductive resin layer 160 may be formed at a position corresponding to the central opening of the shielding pad 470.

Thereby, the shielding pad 470 can demarcate a region where the second thermal conductive resin layer 160 is formed, and can prevent the thermal conductive resin injected into the liquid injection hole 450 from being injected into a region outside the region demarcated by the shielding pad. That is, the shielding pad 470 may shield the thermal conductive resin injected into the liquid injection hole 450 from being applied to a region outside the shielding pad 470.

Further, the shielding pad 470 limits the region to which the thermal conductive resin is applied, the battery module 100 does not go through an additional disassembly and assembly process, and the thermal conductive resin can be uniformly applied to a desired position. Further, the thermal conductive resin can be uniformly applied to a desired position. Additionally, the shielding pad 470 can improve cost efficiency by preventing the thermal conductive resin from being injected to a region where the thermal conductive resin is not required.

As illustrated in FIGS. 4 and 7, in the battery module 100 according to an exemplary embodiment of the present disclosure, a first bus bar 141 is attached to the central part of the bus bar frame 130, and a second bus bar 145 may be attached to both side parts of the bus bar frame 130, respectively. The second bus bar 145 may be a terminal bus bar. The second bus bar 145 may be exposed to the outside of the battery module 100 so that an external device or circuit can be electrically connected to the battery cells 110. In one example, the second bus bar 145 may be connected to an external bus bar that allows connection to another battery module adjacent to the battery module including the second bus bar 145.

More specifically, the first bus bar 141 and the second bus bar 145 are electrically connected to the electrode lead of the battery cell 110 and the degree of heat generation can increase in the charging/discharging process of the battery module 100. In particular, during rapid charging of the battery module 100, the portion where the second bus bar 145 is exposed to the outside may exhibit a relatively large degree of heat generation. However, the portion where the second bus bar 145 is exposed to the outside is far from the first thermal conductive resin layer 310, because of which cooling cannot be performed directly with the first thermal conductive resin layer 310.

As illustrated in FIGS. 6 to 8, the liquid injection hole 450 and the shielding pad 470 may be located adjacent to one end rather than the central part at the upper part of the housing 200. In other words, the liquid injection hole 450 and the shielding pad 470 may be located adjacent to one side end part of the upper plate 400 rather than a central part.

More specifically, the liquid injection hole 450 and the shielding pad 470 may be located at a corner of one side end part in the upper part of the housing 200. In other words, the liquid injection hole 450 and the shielding pad 470 may be located at a corner of one side end part of the upper plate 400. In other words, the liquid injection hole 450 and the shielding pad 470 may be located adjacent to the second bus bar 145.

In one example, the liquid injection hole 450 includes a first liquid injection hole and a second liquid injection hole, and the shielding pad 470 includes a first shielding pad and a second shielding pad. The first liquid injection hole is surrounded by the first shielding pad, and the second liquid injection hole is surrounded by the second shielding pad. In addition, the first liquid injection hole and the first shielding pad may be located at a corner of one side end part in the upper part of the housing 200, and the second liquid injection hole and the second shielding pad may be located at a corner of the other side end in the upper part of the housing 200. In other words, the first liquid injection hole and the first shielding pad may be located adjacent to the second bus bar 145 attached to one side of the bus bar frame 130, and the second liquid injection hole and the second shielding pad may be located adjacent to the second bus bar 145 attached to the other side of the bus bar frame 130.

Accordingly, unlike the conventional battery module 10, in the battery module 100 according to the present embodiment, the second thermal conductive resin layer 160 may be formed adjacent to the portion where the second bus bar 145, which generates the most heat at the upper surface of the battery cell stack 120, is located. That is, it can have a structure that intensely dissipates heat to a portion adjacent to the second thermal conductive resin layer 160, thereby effectively reducing the temperature deviation inside the battery module 100. In particular, the second thermal conductive resin layer 160 can effectively suppress the local temperature rise that occurs in a portion adjacent to the second bus bar 145 during rapid charging.

Hereinafter, a heat transfer path inside the battery module 100 will be described in detail.

Figure 9:
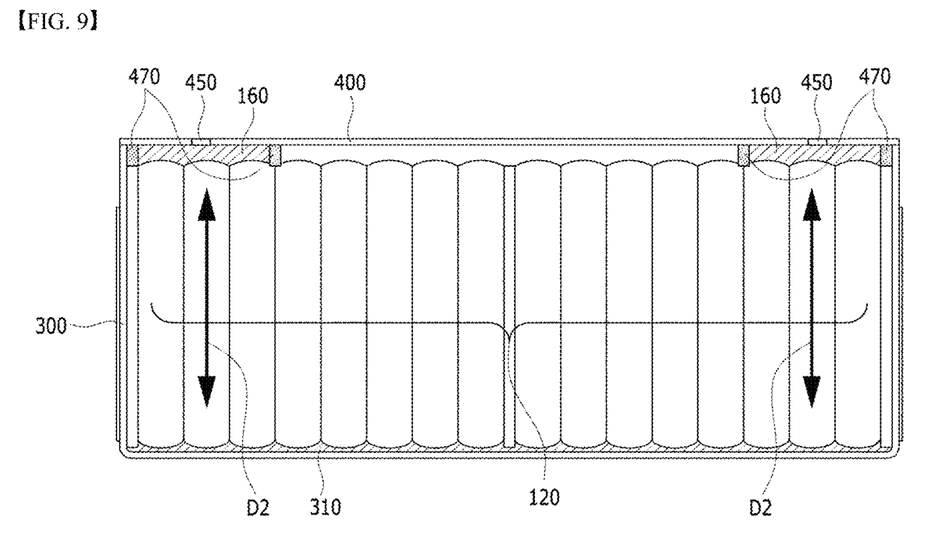
FIG. 9 is a cross-sectional view along the line B-B of FIG. 5.

FIG. 9 is a cross-sectional view along the line B-B of FIG. 5.

As illustrated in FIGS. 5 and 9, the first thermal conductive resin layer 310 is in contact with the lower part of the battery cell stack 120 included in the battery module 100, and one end of the upper part of the battery cell stack 120 may be in contact with the second thermal conductive resin layer 160. In particular, even in the upper part of the battery cell stack 120, the end part of the upper surface of the battery cells 110 adjacent to the portion to which the second bus bar 145 is attached and the second thermal conductive resin layer 160 may contact each other.

Accordingly, the battery module 100 has a structure that cools both the upper part and lower part of the battery cell stack 120, unlike the conventional battery module 10, and thus heat generated in the battery cell stack 120 may be transferred in the second cooling direction D2 toward both the upper part and the lower part.

In particular, as described above, the second thermal conductive resin layer 160 is located adjacent to the second bus bar 145, whereby the lower and upper parts of the portion where the second bus bar 145 is located can be effectively cooled by the first thermal conductive resin layer 310 and the second thermal conductive resin layer 160, respectively, and the temperature difference inside the battery module 100 can be effectively reduced. Additionally, by more effectively suppressing the local temperature rise of the second bus bar 145 that occurs during rapid charging, it is possible to prevent the output of the battery including the battery cell 110 from being limited at an early stage.

One or more of the battery modules according to the present embodiments can be packaged in a pack case to form a battery pack.

The above-mentioned battery module and battery pack including the same can be used in various devices. Such a device can be applied to a vehicle means such as an electric bicycle, an electric vehicle, or a hybrid vehicle, but the present disclosure is not limited thereto, and various devices capable of using a battery module also fall under the scope of the present disclosure.

Although the invention has been shown and described above with reference to the preferred embodiments, the scope of the present disclosure is not limited thereto, and numerous other variations and modifications can be devised by those skilled in the art using the principles of the invention described in the appended claims, which will also fall within the spirit and scope of the present disclosure.

The invention claimed is:

1. A battery module comprising:
   a battery cell stack, which comprises a plurality of battery cells stacked in a first direction;
   a housing for the battery cell stack;
   a first thermal conductive resin layer located between the battery cell stack and a bottom part of the housing; and
   a second thermal conductive resin layer located between the battery cell stack and an upper part of the housing,
   wherein at least one liquid injection hole is formed in the upper part of the housing,
   wherein at least one shielding pad is located on a lower surface of the upper part of the housing, and
   wherein the at least one shielding pad comprises a central opening and surrounds the at least one liquid injection hole.

2. The battery module according to claim 1, wherein:
   the second thermal conductive resin layer comprises a thermal conductive resin injected into the at least one liquid injection hole.

3. The battery module according to claim 2, wherein:
   the second thermal conductive resin layer is surrounded by the at least one shielding pad.

4. The battery module according to claim 1, wherein:
   the at least one liquid injection hole and the at least one shielding pad are located adjacent to one side of the upper part of the housing.

5. The battery module according to claim 4, wherein:
   the at least one liquid injection hole and the at least one shielding pad are located at a corner of the one side of the upper part of the housing.

6. The battery module according to claim 4,
   further comprising bus bar frames located on front and rear surfaces of the battery cell stack, and end plates covering each of the bus bar frames,
   wherein a first bus bar is attached to a central part of each of the bus bar frames, and a second bus bar is attached to both side parts of each of the bus bar frames.

7. The battery module according to claim 6, wherein:
   the second bus bar is a terminal bus bar.

8. The battery module according to claim 6, wherein:
the at least one liquid injection hole and the at least one shielding pad are located adjacent to the second bus bar.

9. The battery module according to claim 1, wherein:
the housing comprises a U-shaped frame including a bottom part and two side parts, wherein the two side parts are connected to opposite sides of the bottom part to form the U-shaped frame, and an upper plate attached to the U-shaped frame to cover the battery cell stack.

10. The battery module according to claim 2, wherein:
the first thermal conductive resin layer is formed by applying a thermal conductive resin or attaching a heat transfer pad to an inner surface of the bottom part of the U-shaped frame.

11. A battery pack comprising the battery module according to claim 1.

* * * * *